United States Patent [19]

Segmuller

[11] 3,737,272

[45] June 5, 1973

[54] IMPROVED INJECTION MOLD APPARATUS FOR THE PRODUCTION OF SUBSTANTIALLY CUP-SHAPED AND SLEEVE-SHAPED THERMOPLASTIC CONTAINERS

[75] Inventor: Bruno Segmuller, Burgacker, Switzerland

[73] Assignee: Segmuller AG, Stein am Rhine, Switzerland

[22] Filed: Sept. 18, 1970

[21] Appl. No.: 74,249

[30] Foreign Application Priority Data

July 15, 1966 Switzerland..........................10320/66

[52] U.S. Cl. ..................425/248, 264/328, 425/249, 425/468
[51] Int. Cl. ................................................B29f 1/06
[58] Field of Search ................18/5 BJ, 5 BM, 45 R, 18/30 WC, 42 D, DIG. 10; 264/328; 425/248, 468, 247, 249

[56] References Cited

UNITED STATES PATENTS

| | | | |
|---|---|---|---|
| 2,252,090 | 8/1941 | Morin et al. | 18/DIG. 10 |
| 2,301,338 | 11/1942 | Smith | 18/DIG. 10 |
| 2,405,329 | 8/1946 | Ruebensul | 18/DIG. 10 |
| 2,434,594 | 1/1948 | Schultz | 18/DIG. 10 |
| 2,465,799 | 3/1949 | Gravesen | 18/DIG. 10 |
| 2,825,093 | 3/1958 | High | 18/DIG. 10 |
| 3,301,928 | 1/1967 | Plymale | 18/5 BJ X |
| 3,305,892 | 2/1967 | Heider | 18/DIG. 10 |

*Primary Examiner*—Robert L. Spicer, Jr.
*Attorney*—Werner W. Kleeman

[57] ABSTRACT

A method for the production of substantially cup-shaped or sleeve-shaped containers from thermoplastic material by injection molding with at least one mold unit incorporating a male mold portion and a female mold portion, comprising the steps of providing at least one movable locking element at the mold unit for locking both of said mold portions when the mold unit is closed, and positively controlling such locking element in a manner that during at least the initial phase of the highest occurring injection pressure the aforesaid locking element interlocks both of said mold portions and in a subsequent phase unlocks said mold portions. The invention also contemplates an improved injection mold unit or assembly which comprises a female mold portion and a cooperating male mold portion. Locking means are provided for locking both of said mold portions when the mold assembly is closed, such locking means and at least one of the said mold portions being relatively movable.

6 Claims, 8 Drawing Figures

PATENTED JUN 5 1973 3,737,272

INVENTOR.
BRUNO SEGMULLER
BY Werner H. Kleeman

IMPROVED INJECTION MOLD APPARATUS FOR THE PRODUCTION OF SUBSTANTIALLY CUP-SHAPED AND SLEEVE-SHAPED THERMOPLASTIC CONTAINERS

RELATED U.S. APPLICATION

The present application is a continuation of my previously filed co-pending United States application, Ser. No. 652,166, filed July 10, 1967, now abandoned and entiteld "Method for the Production of Substantially Cup-Shaped and Sleeve-Shaped Containers or the Like formed of Thermoplastic Material by Injection Molding and Improved Injection Mold for Carrying out the Aforesaid Method."

BACKGROUND OF THE INVENTION

The present invention pertains to an improved method of manufacturing molded articles, especially substantially cup-shaped or sleeve-shaped containers formed of thermoplastic material by injection molding with the use of at least one mold assembly or unit incorporating a male mold portion and a female mold portion. At the region of the mold portions which corresponds to the bottom and/or side portions of the container to be manufactured, there is provided at the male mold portion and/or at the female portion at least one movable locking element for locking both of the mold portions, when the mold assembly is closed, towards one another in radial and/or axial direction. The present invention further pertains to an improved injection mold assembly or unit for carrying out the aforesaid method.

The previously known injection molding techniques or methods for producing relatively thin-walled cups or containers from plastic have the drawback that the forces which occur owing to the cumulation of the injection pressure on account of the small wall thicknesses of the articles or objects to be manufactured tend to displace the male mold portion out of its central position in the female mold portion. Consequently, considerable differences in the wall thickness can appear in the finished thin-walled cups or containers.

Therefore, in order to overcome such drawbacks, it has already been attempted to secure the male mold portion in its position by means of a bolt member or the like which can be displaced against spring force. More precisely, this bolt member during the starting position engages at the front of the male mold portion and upon reaching a certain pressure in the injection molding material this bolt member retracts in order to render possible the manufacture of a completely closed bottom of the manufactured article.

According to another known injection mold assembly, the male mold portion is displaceably retained in its axial direction against spring force and in its starting position is held in form-locking or positive fashion at its front in such a manner that it cannot deviate or escape in radial direction. Upon reaching a predetermined injection pressure, the male mold portion is displaced in axial direction against the spring force away from the form-locking acting locking means owing to the pressure prevailing in the injection molding material. Such displacment of the male mold portion is undertaken in order to prevent an opening at the location of locking at the container which is to be manufactured.

However, these known devices possess the drawback that upon the occurrence of the highest injection pressure, that is to say, at that moment when a locking of the free end of the male portion with respect to the female portion would be most necessary in order to prevent irregular wall thicknesses at the container to be manufactured, the locking means is released.

SUMMARY OF THE INVENTION

Accordingly, it is a primary object of the present invention to provide an improved method of and injection mold assembly for manufacturing molded articles in a manner which overcomes the drawbacks of the prior art techniques and structures.

Still, another significant object of the present invention relates to the provision of an improved method and apparatus for the production of molded articles, especially thin-walled, substantially cup-shaped or sleeve-shaped containers or the like in a manner ensuring for extremely efficient production at a relatively high rate of manufacture, efficient operation of the mold assembly, and uniformity in the wall thicknesses of the articles being manufactured.

Generally speaking, the inventive method is manifested by the features that the locking element is positively controlled in such a manner that during at least the initial phase of the highest occurring injection pressure, said locking element interlocks both of said mold portions and in a subsequent phase unlocks said mold portions.

As already explained, the invention is also concerned with an improved injection mold assembly for the performance of the aforesaid inventive method which is characterized by the features that the locking element or the locking elements and/or the counterelement or counterelements for such are constructed in a manner that the locking element or elements in the locking position contact a number of contact surfaces which are separated from one another.

BRIEF DESCRIPTION OF THE DRAWINGS

The invention will be better understood, and objects other than those set forth above, will become apparent, when consideration is given to the following detailed description thereof. Such description makes reference to the annexed drawings wherein like reference characters have, for the most part, generally been employed for the same or analogous elements, and wherein.

DESCRIPTION OF THE PREFERRED EMBODIMENTS

Before describing in detail the various exemplary embodiments of inventive injection mold assembly or unit, it should be helpful to briefly review some of the prior art solutions and constructions employed in the injection molding art. More particularly, in previous known constructions of injection mold units, it has been attempted to loosely or freely arrange the male mold portion, so that the latter is capable of optimumly accommodating itself to the pressure conditions existing between the male mold portion and the female mold portion which exist during the injection molding operation. The purpose of this consideration is based upon the premise of obtaining the best possible centering of the male mold portion with respect to the female mold portion. However, such a loose, floating arrangement of the male mold portion in every case results in an uncontrolled element during the injection molding operation, so that in this decisive phase there is missing one of the most important components for the molding operation, namely, the exact guiding or locking.

Figure 1:
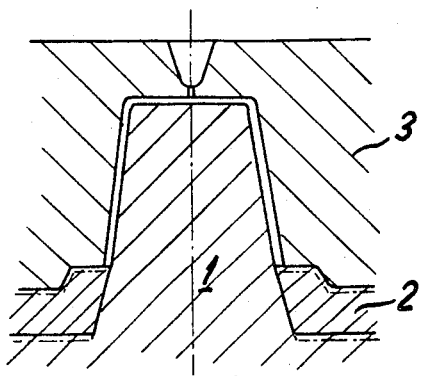
FIGS. 1 and 2 schematically depict in sectional view two prior art exemplary embodiments of constructions of mold assemblies.
Figure 2:
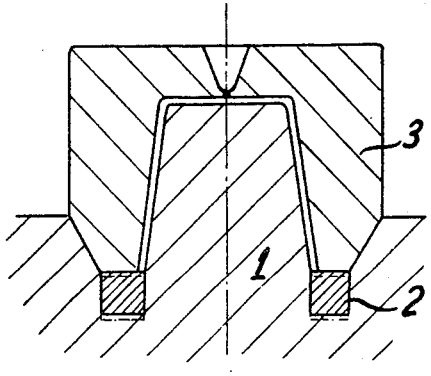

Now, as shown for instance in FIGS. 1 and 2, the prior art solutions have already attempted to improve centering of the male mold portion with respect to the female mold portion by providing conical fittings or sockets for exactly centering the male mold portion 1, the stripping plate 2 and the female mold portion 3, and to thereby obtain a greater stability and improved centering. However, these prior art physical manifestations possess the disadvantage that at the important moment of injecting of the plastic, the male mold portion 1 will be displaced out of the conical centering means, as shown in phantom lines, owing to the axially directed pressure, and consequently, the exact centering or guiding of the male mold portion 1 in the female mold portion 3 is no longer ensured.

Injection mold assemblies are also known to the art which possess rigidly arranged support ribs. However, in these mold assemblies or units there appear at the locations of the ribs thin or, in fact, unfilled locations, which are completely unacceptable for many applications of such containers.

Accordingly, in FIGS. 3 to 7, there are shown exemplary inventive constructions or embodiments for the positive centering of the male mold portion 1 in the recess of the female mold portion 3.

Figure 3:
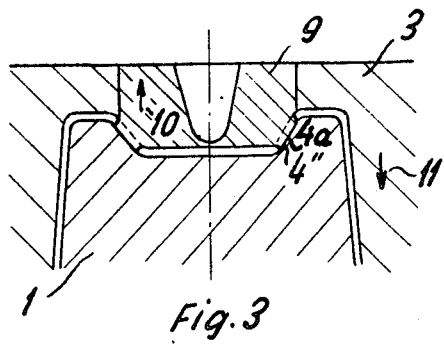
FIGS. 3 and 4 illustrate in sectional view two respective exemplary embodiments of inventive mold assemblies where there are provided projection means at respective insert members which can be displaced substantially parallel to the axis of the male mold portion of the mold assembly.

In the event that the cups or containers are provided for special purposes, for instance, for hot filling, then the thin locations at the bottom portion of the cups or containers which could appear at the location of the ribs are not desired. In this case, the embodiment of mold assembly depicted in FIG. 3 is particularly suitable. Here, the ribs 4'' are provided at an insert member 9 which is arranged at the female mold portion 3 to be displaceable along the longitudinal axis of the male mold portion 1. The space between the female mold portion 3 and male mold portion 1 providing a mold cavity therebetween.

After filling or charging of the material to form a cup during the initial portion of the injection molding operation, and specifically, during the second phase of the injection molding operation, that is to say, during the so-called after pressure phase, the displaceable insert member 9, previously extending into the mold cavity and thus obstructing the free-flow of material throughout the entire mold cavity, is now retracted in the direction of the arrow 10 out of the mold cavity, so that the thin plastic locations in the cup are completely or partially filled. The same action can also be achieved if the female mold portion 3 is forwardly displaced in the direction of the arrow 11 with respect to the insert member 9. Instead of the arrangement depicted in FIG. 3, it is also possible for the portion of the male mold portion 1 provided with ribs 4 or cooperating with the ribs 4 of the female mold portion 3, respectively, to be constructed as an insert member 12 which is displaceable substantially parallel to the axis of the male mold portion 1.

Figure 4:
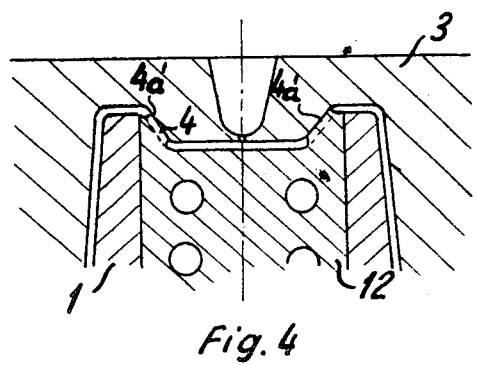

More particularly, in FIG. 4, there is depicted how this insert member 12 which is displaceably arranged in the male mold portion 1 is formed by a cooling insert. This insert member 12 is retracted in the after-pressure phase in axial direction of the male mold portion 1, analogous to the movement of the insert member 9 of FIG. 3, so that the thin locations which appear during the first injection phase are completely or partially filled. Further, it will be recognized that in FIG. 3, the male mold portion 1 is provided with separate contact or bearing surfaces 4a against which bear the projections 4'' of the insert member 9, whereas in FIG. 4, the female mold portion 3 is provided with such separate contact or bearing surfaces 4a' against which bear the projections 4 of the insert member 12.

Figure 5:
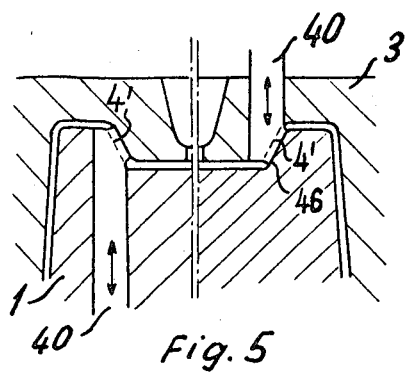
FIGS. 5 and 6 depict sectional views of two further respective embodiments of inventive mold assemblies wherein the projection means are formed by displaceable support elements.
Figure 6:
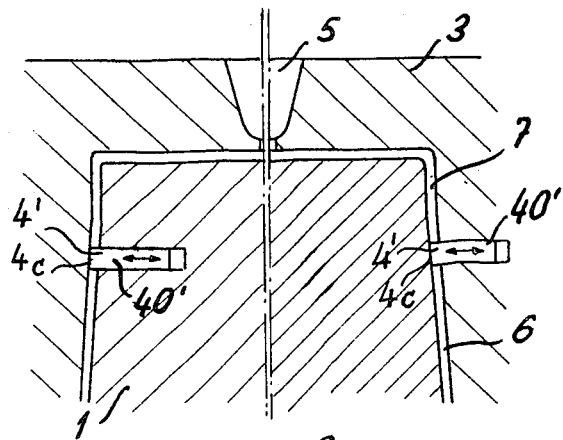

FIGS. 5 and 6 depict two respective embodiments wherein the projections 4' are formed by bearing or support elements 40 and 40', respectively. These bearing or support elements 40 and 40' are movably arranged in the relevant mold portion in such a manner that the size of their projection can be changed during the injection molding operation. In these embodiments, the support elements 40 and 40' which are constructed as centering bolt members are appropriately displaced during the so-called after-pressure phase of the injection molding operation in order to prevent thin locations at the place of support for the male mold portion 1, so that the thin locations are completely or partially filled. In FIG. 5, the bearing or contact surfaces for the support elements 40 are designated by reference numeral 4b, whereas in FIG. 6, such bearing or contact surfaces are designated by reference numeral 4c. It should be appriciated that, these centering bolts 40 and 40' defining the support elements can be either arranged in the female mold portion 3 as shown at the right of FIG. 5, as well as also at the male mold portion 1 as shown at the left of such Figure, and further, can be actuated by conventional mechanical or hydraulic expedients for instance.

The embodiment of mold assembly or unit depicted in FIG. 6 is particularly suitable for the situations where, on account of reasons of application of the finished product, the cup-like container should not exhibit at its bottom any indentations or outwardly directed projections or bulges. These centering devices 40' at the side of the male mold portion 1 and acting in a radial direction with respect to the longitudinal axis of such male mold portion 1 render it possible to maintain the bottom of the container flat and, at the same time, guarantee for an effective and exact centering of the male mold portion 1 in the female mold portion 3.

Due to the arrangement of the protrusions depicted in the embodiments of FIGS. 3 to 6, and particularly the ribs disposed at the region of the mold portions 1, 3 which correspond to the floor portion or bottom of the container to be manufactured, and specifically, at the male mold portion and/or at the female mold portion, there is brought about a very exact centering of the free end of the male mold portion at the side of the injection nozzle means. Consequently, cups or the like or also larger containers with very thin wall thicknessess, or even pre-molded articles subsequently formed into a finished product like those just mentioned, can be injection molded faultlessly and with uniform wall thickness.

Figure 7:
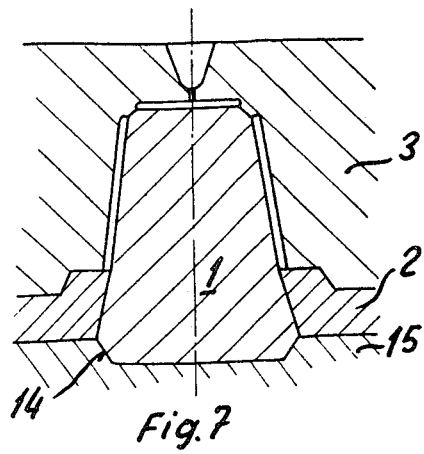
FIG. 7 is an exemplary embodiment of a further mold assembly designed according to the teachings of the present invention and wherein the male mold portion is supported by means of a conical fitting at a retaining plate member for the male mold portion.

According to a further aspect of the invention, it can be advantageous, as shown in the embodiment depicted in FIG. 7, to support the male mold portion 1 by means of a fitting or socket portion 14 provided in a retaining plate member 15 for the male mold portion 1, which fitting portion 14 conically narrows in a direction away from the male mold portion 1. By virtue of this conical fitting portion 14, the pressures acting upon the male mold portion 1 in axial and radial direction with respect to the axis of such male mold portion are transmitted to the retaining plate member 15, so that the latter does not have the tendency of giving when pressure is applied to the male mold portion, in other words, with a standard construction will not have the tendency to bend. The connection between the male mold portion 1 and the retaining plate member 15 can also be carried out with a certain initial stress or pre-stress.

Figure 8:
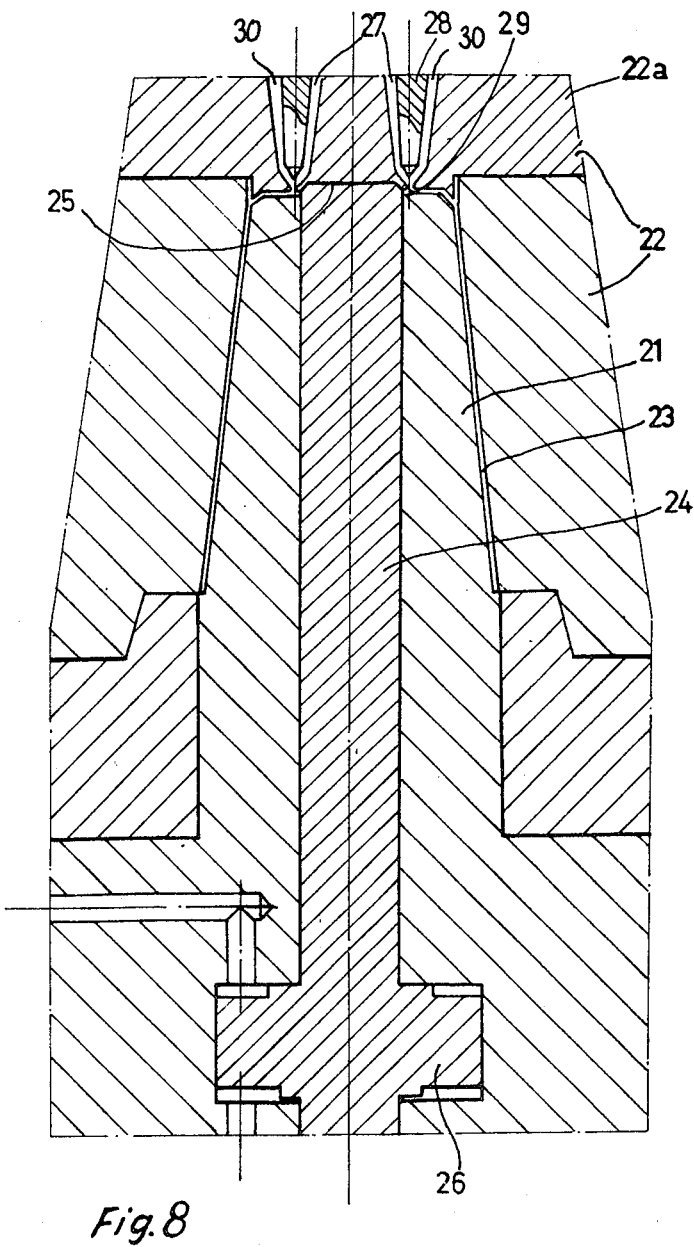
FIG. 8 is a sectional view of a further embodiment of inventive mold assembly or unit.

The injection mold depicted in FIG. 8 incorporates a male mold portion 21 and a female mold portion 22 provided with a floor portion 22a. When the mold assembly is closed, there is formed between this male mold portion 21 and the female mold portion 22 an intermediate compartment or mold cavity 23 for the cups or the like which are to be manufactured.

Now, in order to prevent a lateral displacement of the male mold portion 21 internally of the female mold portion 22 during the injection operation, and therefore, to also prevent irregular wall thicknesses at the cup or container which is to be manufactured, there is provided internally of this male mold portion 21 a ram-like locking element or means 24 which is arranged to be axially displaceable. This locking element 24 can be displaced in its axial direction into a recess means 25 at the floor portion 22a of the female mold portion 22, in order to bring about a mutual locking of both mold portions 21 and 22. This recess means 25 can be conceptually considered as providing a number of bearing or contact surfaces for the confronting ram-like locking element 24.

Further, since during an injection cycle there is only available a very short time for interlocking both of the mold portions 21 and 22, it is necessary that the ram-like locking element 24 be moved back and forth very quickly in order to prevent formation of a recess in the bottom of floor of the container of cup which is to be manufactured. In order to achieve this high displacement velocity and a high contact pressure in the locked position, it is advantageous to operate the locking element 24 hydraulically for instance, for which purpose there is arranged at the lower portion of such locking element 24 a double-acting piston unit 26.

Further, it should be understood that the male mold portion 21 is equipped with an efficient cooling arrangement of standard construction and for this reason not shown in the drawings, so that the times required for solidification of the plastic injected into the mold assembly can be held to a minimum. The guide lines or standards which are to be taken into consideration during the construction of a suitable cooling system are well known to those skilled in the art, for instance, they are described in the German article by Karl Morwald, entitled "Einblick in die Konstruktion von Spritzgusswerkzeugen" (translated as "Insight into the construction of injection molding devices"), published by Brunke Garrels, Hamburg 1965, with particular reference being made to pages 28 to 33, inclusive.

In order to obtain a uniform and nonetheless very quick injection of the molding material into the mold assembly, there is arranged concentric to the looking element 24 at the floor portion 22a of the female mold portion 22, a four fold-injection nozzle arrangement 27. This nozzle arrangement 27 does not form part of the subject matter of the present invention, but is described in detail in my commonly assigned, co-pending United States patent application, Ser. No. 652,068 filed July 10, 1967, and entitled "Injection nozzle for hot channel-injection molding device," and further is advantageously constructed as a hot channel-injection nozzle wherein there is provided a heat conducting core 28 of the associated delivery channel 30 which extends into the associated injection opening 29.

During operation of this injection molding machine, the ram-like locking element 24 is controlled in such a manner that, upon the appearance of the greatest injection pressure, it is most forcefully pressed into the recess means 25 of the female mold portion 22a. In other words, the locking action between both of the mold halves 21 and 22, is greatest during this critical period of time. In the subsequent, so-called after-pressure phase, the locking element 24 is retracted, in other words the locking action is released, so that the portion of the container which is to be manufactured and which is located between the locking element 24 and the recess 25 in the floor portion 22a of the female mold portion 22 can also be filled with injection molding material. In fact, it is here mentioned that with all of the constructions of molding equipment and techniques hereindescribed during the after-pressure phase, that is where both mold portions have been unlocked, the flow communication of the molding material from its supply to the mold cavity for completely filling the latter, is continuously established and open.

Finally, as mentioned herein, the inventive teachings are not only useful for producing finished molded articles such as thin-walled cups and containers, but can be employed advantageously to fabricate pre-molded articles, such as tubes or the like, which are then further worked to a finished product, such as the just-mentioned cups and containers. Hence, the term "molded articles" as used herein is employed in its broader sense as encompassing both semi-finished and finished molded products.

While there is shown and described present preferred embodiments of the invention, it is to be distinctly understood that the invention is not limited thereto, but may be otherwise variously embodied and practiced within the scope of the following claims.

What is claimed is:

1. An injection mold assembly for the production of molded articles, especially thin-walled cup-shaped or sleeve-shaped containers formed of thermoplastic material, comprising a female mold portion, a cooperating male mold portion including a longitudinally extending opening for receiving locking means therein, said locking means movably positioned within said longitudinally extending opening for selectively locking both of said mold portions when the injection mold assembly is closed, said movable locking means comprising a substantially ram-like locking element having an outer surface which engages the inner surface of said longitudinally extending opening to provide lateral support for said male mold portion, said female mold portion being provided with recess means for receiving said ram-like locking element, a double-acting piston and cylinder arrangement provided for said ram-like locking element in order to positively control said ram-like locking element in such a manner that during the entire initial phase of injection molding at which time the greatest injection molding pressure arises said ram-like locking element is displaced in axial direction into said recess means so as to lock both of said mold portions relative to one another and only during a subsequent phase during which the injection molding terminates at a lower injection molding pressure are said mold portions unlocked by axially displacing said ram-like locking element in a direction away from said recess means.

2. An injection mold assembly as defined in claim 1, wherein said movable locking means provided at said male mold portion is disposed at the region of the portion of said male mold portion serving to form the bottom of the article to be manufactured.

3. An injection mold assembly as defined in claim 1, further including a number of separate contact surfaces, said movable ram-like locking element upon assuming its locking position contacting said number of separate contact surfaces.

4. An injection mold assemble as defined in claim 3, wherein said recess means defines said number of contact surfaces.

5. An injection mold assembly as defined in claim 1, wherein said locking means acts to axially interlock both of said mold portions with respect to one another.

6. An injection mold assembly as defined in claim 1, further including channel means defining a hot runner system.

* * * * *